Patented June 8, 1937

2,082,787

UNITED STATES PATENT OFFICE 2,082,787

PROCESS FOR REMOVING DISPERSED RESIDUAL BLACKSTRAP

Arthur E. Birch, Lansdowne, Pa., assignor to The Atlantic Refining Company, Philadelphia, Pa., a corporation of Pennsylvania No Drawing. Application August 2, 1934, Serial No. 738,066

6 Claims. (Cl. 196—33)

The present invention relates to a process for separating from hydrocarbon oils, particularly light petroleum distillates, finely divided material containing lead sulfide which remains suspended or dispersed therein after such distillates have been subjected to a "sweetening" treatment with alkaline plumbite solution.

Most light mineral oil distillates, such as gasoline, kerosene and furnace oils, contain sulfur compounds which render them corrosive and of disagreeable odor, and therefore unsuitable for the market. These compounds may be partially removed or at least converted to less objectionable form, by agitating the distillate with an alkaline plumbite solution, with or without the addition of free sulfur or other substances to complete the "sweetening" reaction.

By such treatment there is formed a black, insoluble precipitate, commonly known as "blackstrap", the bulk of which settles away from the treated oil with the aqueous solution of spent plumbite. This precipitate consists of lead sulfide together with the lead salts of the mercaptans, and other organic compounds of lead.

However, it has been found that while the bulk of the blackstrap is removed from the sweetened oil with the spent plumbite solution, a small portion of finely divided blackstrap remains suspended in the finished oil. This suspended material is usually removed by permitting the treated oil to remain in storage for relatively long periods, during which time the solids gradually settle to the bottom of the storage vessel, from which they must be removed periodically at a considerable expense.

In order to rapidly and economically remove this suspended blackstrap and recover it in a form in which it may be readily reformed into plumbite treating agent, I propose to treat the plumbite sweetened oil with an alkaline agent capable of wetting the suspended blackstrap and thereby form an emulsion which may readily be separated from the sweetened oil. Among the alkaline agents suitable for use in my process are aqueous solutions of the alkali metal hydroxides, carbonates, silicates and phosphates. However, I prefer to employ, in my process for separating blackstrap suspensions, an agent consisting of an aqueous caustic alkali solution such as may be recovered, for example, from spent plumbite solutions, or spent alkali solutions resulting from the washing of sour hydrocarbon oils. Aqueous caustic alkali solutions, such as those recovered in accordance with the process for breaking blackstrap emulsions, disclosed in a copending application Serial No. 702,546, of John L. Oberseider and Paul L. Robison, filed Dec. 15, 1933, may be advantageously employed in my process.

I have found that by mixing a plumbite sweetened distillate containing suspended lead sulfide or blackstrap, with an alkaline solution, for example, recovered caustic soda solution, there is formed an emulsion of caustic soda solution and distillate which is stabilized by the small particles of blackstrap, and that upon standing for a relatively short period of time, the emulsion separates from the main body of the treated distillate, leaving the latter substantially free of suspended blackstrap. The emulsion thus formed, together with any free caustic solution, may be used repeatedly for treating additional quantities of distillate. Upon considerable re-use, the emulsion attains a liver-like consistency and becomes incapable of removing further quantities of suspended blackstrap. At this stage, such emulsion is preferably added to the spent plumbite sweetening solution mentioned hereinabove and the mixture is then processed to reform fresh plumbite sweetening solution. Such processing may consist in heating the blackstrap in the presence of recovered and/or fresh caustic soda solution while contacting the mixture with an oxygen-containing gas, whereby sodium plumbite is regenerated.

A particular advantage of my process, when employing recovered caustic solution for removing suspended blackstrap, is that the resulting emulsion containing the blackstrap may be passed directly to the sodium plumbite regeneration system and the valuable constituents of the emulsion, i. e., the caustic soda and the blackstrap may be completely recovered and converted into fresh sweetening reagent.

The hydrocarbon oil, after treatment with alkaline agent, may, if desired, be washed with water in order to remove any traces of said agent from the oil.

While I have described my invention particularly with reference to the employment of recovered caustic soda solutions, it is to be understood that fresh caustic soda solution may be utilized in whole or in part as a substitute therefor.

What I claim is:

1. The process for removing dispersed residual blackstrap from a plumbite sweetened hydrocarbon oil from which the bulk of the blackstrap formed during the plumbite treatment of the oil has been removed, which comprises contacting said oil with an aqueous alkaline solution to emulsify the dispersed blackstrap and separating from the treated oil the emulsion so formed.

2. The process for removing dispersed residual blackstrap from a plumbite sweetened hydrocarbon oil from which the bulk of the blackstrap formed during the plumbite treatment of the oil has been removed, which comprises contacting said oil with an aqueous caustic soda solution to emulsify the dispersed blackstrap and separating from the treated oil the emulsion so formed.

3. In the removal of blackstrap from hydrocarbon oil which has been sweetened with plumbite solution and from which the bulk of the blackstrap formed during the plumbite treatment of the oil has been removed, the step of emulsifying the blackstrap which remains in the oil after separation therefrom of spent plumbite solution, which comprises bringing it into contact with an aqueous alkaline solution.

4. In the removal of blackstrap from hydrocarbon oil which has been sweetened with plumbite solution and from which the bulk of the blackstrap formed during the plumbite treatment of the oil has been removed, the step of emulsifying the blackstrap which remains in the oil after separation therefrom of spent plumbite solution, which comprises bringing it into contact with an aqueous caustic soda solution.

5. In the removal of blackstrap from hydrocarbon oil which has been sweetened with plumbite solution and from which the bulk of the blackstrap formed during the plumbite treatment of the oil has been removed, the step of emulsifying the blackstrap which remains in the oil after separation therefrom of spent plumbite solution, which comprises bringing it into contact with an aqueous alkaline solution recovered from treatment of oil with such solution.

6. In the removal of blackstrap from hydrocarbon oil which has been sweetened with plumbite solution and from which the bulk of the blackstrap formed during the plumbite treatment of the oil has been removed, the step of emulsifying the blackstrap which remains in the oil after separation therefrom of spent plumbite solution, which comprises bringing it into contact with an aqueous caustic solution recovered from treatment of oil with such solution.

ARTHUR E. BIRCH.